United States Patent [19]

Neffgen et al.

[11] Patent Number: 5,274,012
[45] Date of Patent: Dec. 28, 1993

[54] HYDROXYL GROUP-CONTAINING EPOXY RESIN REACTED WITH POLYOXYALKYLENE (URETHANE)-ISOCYANATE

[75] Inventors: Bernd Neffgen, Selm; Wolfgang Scherzer, Werne, both of Fed. Rep. of Germany

[73] Assignee: Witco GmbH, Postfach, Fed. Rep. of Germany

[21] Appl. No.: 972,796

[22] Filed: Nov. 6, 1992

[30] Foreign Application Priority Data

Nov. 11, 1991 [DE] Fed. Rep. of Germany ....... 4136943

[51] Int. Cl.$^5$ .................. C08G 59/14; C08K 3/20; C08L 63/02
[52] U.S. Cl. .................. 523/415; 523/404; 525/486; 525/524; 525/528; 528/73
[58] Field of Search ............... 523/404, 415; 525/486, 525/524, 528; 528/73

[56] References Cited

U.S. PATENT DOCUMENTS

| | | | |
|---|---|---|---|
| 3,799,797 | 3/1974 | Hughes | 117/72 |
| 4,399,242 | 8/1983 | Fowler et al. | 525/524 |
| 4,423,201 | 12/1983 | Hicks | 528/76 |
| 4,446,256 | 5/1984 | Hicks | 523/402 |
| 4,801,662 | 1/1989 | Fischer | 525/504 |
| 4,824,888 | 4/1989 | Emmerling et al. | 524/569 |
| 5,034,435 | 7/1991 | Squiller et al. | 523/415 |

FOREIGN PATENT DOCUMENTS

| | | |
|---|---|---|
| 3643751 | 6/1988 | Fed. Rep. of Germany . |
| 2007672 | 5/1979 | United Kingdom . |
| 91/10695 | 7/1991 | World Int. Prop. O. . |

OTHER PUBLICATIONS

Derwent accession No. 68-77881P/00 for Canadian Patent No. 783,630, Standard Products Co.
Derwent accession No. 84-198157/32 for Japanese Patent No. 59-113,023, Jun. 29, 1984, Dainippon Ink Chem. Co..
Derwent accession No. 84-291667/47 for Japanese Patent No. 59-179,896, Oct. 12, 1984, Toho Chem Ind. Ltd.
Derwent accession No. 92-099942/13 for Japanese Patent No. 40-41,582, Feb. 12, 1992, Yokohama Rubber.

Primary Examiner—Robert E. Sellers
Attorney, Agent, or Firm—Curtis, Morris & Safford

[57] ABSTRACT

The invention relates to modified polyoxyalkylene epoxy resins based on polyhydric phenols prepared by the addition of polyethers and/or polyether monourethanes containing isocyanate groups to higher-molecular-weight hydroxyl group-containing polyglycidyl compounds, and to the use of these reaction products in the preparation of stable aqueous dispersions.

2 Claims, No Drawings

HYDROXYL GROUP-CONTAINING EPOXY RESIN REACTED WITH POLYOXYALKYLENE (URETHANE)-ISOCYANATE

The invention relates to modified polyoxyalkylene epoxy resins based on polyhydric phenols, a process for preparing them, and their use in the preparation of stable aqueous dispersions.

In the surface-coating field, for example, in the paint sector and in building preservation, polyglycidyl ethers, and particularly the higher-molecular-weight solid products, based on polyhydric phenols have proved themselves for years because of their outstanding technological properties. Crosslinking with the curing agents commonly used in this field, such as amines, carboxylic acids, acid anhydrides and dicyandiamide, has been accomplished mainly by their use in organic solvents.

However, the increasingly stringent environmental-acceptability standards which coating systems must meet have led to a critical evaluation of the use of such organic solvents.

Excessive air and water pollution in particular has given rise to the development of largely water-based systems in recent years.

Aqueous dispersions can be prepared by the use of external emulsifiers. However, one of the drawbacks which this entails is that dispersions so prepared are not very stable.

U.S. Pat. No. 4,446,256 describes emulsifiers whose hydrophobic component is adapted to the resin to be dispersed and whose hydrophilic component is attached to the ends of the molecules through connecting units. While dispersions prepared with these compounds exhibit improved stability, they cannot be permanently incorporated into the thoroughly cured system since they are external, nonreactive components.

The emulsifiers described in WO91/10695 are prepared by reacting hydrophilic molecules through connecting units with the epoxy groups of an epoxy resin. This entails a loss of epoxy functionality. For the preparation of crosslinked systems, these compounds can therefore only be used as reactive emulsifiers for epoxy resins of the same type.

From published German patent application OS 36 43 751, self-emulsifying epoxy resins are known which are obtained by attaching the epoxy resins directly to a long-chain hydrophilic part of the molecule. The molar ratio is selected so that the reaction product has terminal epoxy groups.

In U.S. Pat. No. 4,423,201, this principle is modified in that, in a first step, the hydrophilic part is linked through an isocyanate with excess polyhydric phenol and, in a second step, the terminal phenolic hydroxyl groups are extended with liquid glycidyl ethers to the corresponding polyhydric compounds carrying epoxy groups.

When these self-emulsifying glycidyl compounds are used, the use of additional external emulsifiers can be dispensed with.

It is clear that with this process a relatively high proportion of alkylene oxide is required per mole of polyhydric phenol, which could have an adverse effect on the physical and chemical properties of the crosslinked end product.

One object of the present invention thus is to provide a self-emulsifying epoxy resin which can be prepared without loss of epoxy-group functionality and in which the proportion of alkylene oxide can be kept to a minimum.

This object is accomplished through polyoxyalkylene epoxy resins based on polyhydric phenols.

The invention thus relates to compounds of the general formula

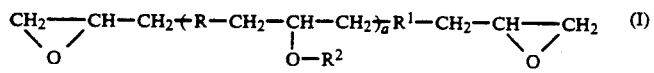

where R and $R^1$ represent, independently of each other,

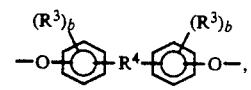

or

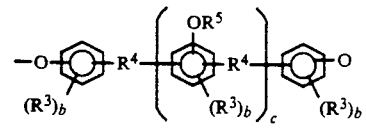

wherein
$R^3$ is a $C_{1-3}$ alkyl group,
$R^4$ is a $C_{1-4}$ alkylene moiety,
$R^5$ is

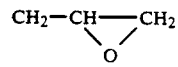

each b is, independently of one another, an integer from 0 to 4, and
c is 1 to 10;
a is 1 to 20, and
$R_2$ is H and at least once the group

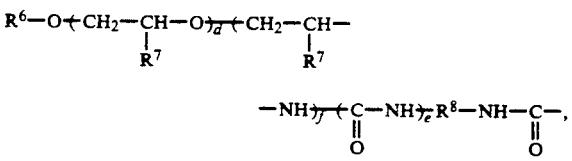

$R^6$ is a $C_{1-5}$ alkyl group,
$R^7$ is H or $CH_3$—,
d is 1 to 100,
e is 0 or 1,
f is 0 or 1, and
$R^8$ is an aliphatic, cyclic, alicyclic, aromatic or araliphatic hydrocarbon group.

The invention has as a further object which can be prepared by reacting, in a first step, monoalkyl ethers of polyoxyalkylene diols with difunctional isocyanates in a molar ratio of from 1:1 to 1:6, optionally by the use of catalysts and solvents, at temperatures of from 40° to 100° C., and optionally separating excess diisocyanate and solvent, and reacting, in a second step, monourethane containing isocyanate groups with di and/or polyglycidyl ethers based on bisphenols or novolacs in a molar ratio of from 1:1 to a:1, at temperatures of from 40° to 100° C., optionally by the use of catalysts and solvents, or by reacting monoalkyl ethers of polyoxyalkylene monoisocyanates of the general formula

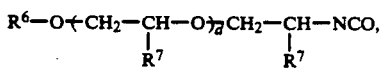

where $R^6$, $R^7$ and d have the meanings given above, with polyglycidyl ethers based on bisphenols or novolacs in a molar ratio of from 1:1 to a:1 at temperatures of from 40° to 100° C., optionally by the use of catalysts and/or solvents.

Other objects of the invention are water-dispersible mixtures, aqueous dispersions and curable mixtures which contain at least one of the compounds of the general formula (I) which can be prepared by the procedures outlined above.

The polyglycidyl ethers in accordance with the invention are self-emulsifying compounds which can be used alone or for dispersing the known glycidyl ethers or glycidyl esters.

Since, in the compounds of the invention, the hydrophilic parts are not confined to specific discrete regions of the molecule, such as midpoint or end of chain, but may be distributed over the entire molecule, their use permits the preparation not only of stable dispersions which may have high solids contents, if desired, and which exhibit a better rheology than the known dispersions, but also of thermosets possessing improved mechanical, physical and chemical properties.

For the preparation of the compounds of the invention, all polyglycidyl compounds which on average contain at least one hydroxyl group per molecule may be used in principle. An overview of these compounds will be found in Chapter 2 of the Handbook of Epoxy Resins, by Lee & Neville, 1967.

Preferred are, however, in accordance with the invention the polyglycidyl ethers based on bisphenols, and particularly on bisphenol F [bis(4,4'-hydroxyphenyl)methane], bisphenol A [2,2-bis(4,4'-hydroxyphenyl)propane] and bisphenol C [2,2-bis(3,3'-methyl-4,4'-hydroxyphenyl)propane] with epoxide equivalent weights of about 310 to about 2,000, and preferably from 400 to 800, and glycidyl ethers based on novolacs with about 3 to 15 benzene rings per molecule and epoxide equivalent weights of preferably 156 to 175.

The monoalkyl ethers of polyoxyalkylene diols to be reacted in the first step with isocyanates are homopolymers of ethylene oxide or copolymers of ethylene oxide and propylene oxide wherein the two monomer units are distributed randomly or in block fashion. To obtain hydrophilic molecules, the use of pure ethylene oxide polymers with from 1 to about 100, and more particularly from 2 to 50, repeating units is preferred. The group attached through an ether link is preferably an alkyl group having from 1 to 5 carbon atoms, and more particularly the methyl or ethyl group.

The diisocyanates used are commercial-grade aliphatic, cyclic, alicyclic, aromatic or araliphatic isocyanates. In accordance with the invention, aliphatic, cyclic, alicyclic and aromatic diisocyanates are preferably used. Illustrative of these are bis(p-phenylisocyanate), bis(p-phenyl)methylene 1,4-phenylene diisocyanate, 4,4'-diphenylmethane diisocyanate, 2,2-bis(4,4'-isocyanatophenyl)propane and hexamethylene diisocyanate, and particularly those with groups of different reactivity, such as isophoronediisocyanate(3,3,5-trimethyl-1-isocyanato-5-isocyanatomethylcyclohexane, toluylenediisocyanate(2,4(2,6)-diisocyanato-1-methylbenzene) and 1,3-phenylene diisocyanate.

One or more of these isocyanates is reacted with the monoalkyl ethers of the polyoxyalkylene diols in a molar ratio of from 1:1 to 6:1, optionally by the use of solvents such as xylene or toluene and of catalysts such as N-methyl morpholine, dimethylethanolamine, triethylamine, di(-n-butyltin) diacetate or di(-n-butyltin) dilaurate, 1,4-diazabicyclo[2,2,2]octane or mixtures thereof, at temperatures of from 40° to 100° C., to give the monourethane resins containing free isocyanate groups. As a rule, the isocyanate, and optionally the solvent and the catalyst, are heated to the reaction temperature and the polyoxyalkylene diol monoalkyl ether containing hydroxyl groups is added dropwise. The reaction usually goes to completion in approximately 0.5 to 2 hours. The excess isocyanate, if any, and the solvent are then separated by the usual methods.

In the second step, the product of this reaction is added usually without purification to the di- or polyglycidyl compound containing the catalyst at a temperature of 40°–100° C. Both components are preferably used diluted with solvents such as xylene or toluene.

When polyoxyalkylene isocyanates are used, they are reacted directly with the glycidyl compounds by the procedure outlined for the second step.

The ratio of isocyanates, or of first-step reaction products containing isocyanate groups, to polyglycidyl ethers may vary over a wide range.

The lower limit of the range is such that the sum of the hydrophilic units (the number of repeating units d of the general formula [I]) is sufficient to render the overall molecule self-dispersing in water. The required sum of hydrophilic units is also determined by the epoxide equivalent weight of the glycidyl compound, that is, by the number of repeating units a of the general formula (I). The required hydrophilic units can be introduced into the molecule by crosslinking a few long polyoxyalkylene units or many short ones, or an appropriate combination of short and long polyoxyalkylene units, with the hydroxyl groups of the glycidyl compounds.

In accordance with the invention, a judicious combination of polyoxyalkylene derivatives with graded chain lengths is preferred.

An upper limit is imposed on the hydrophilic portions only by the requirements which the mechanical, physical and chemical properties of the thermoset have to meet. Partial or complete water solubility of the compounds of the invention can thus be achieved with a sufficiently high proportion of hydrophilic units.

However, with a view to obtaining adequate, and preferably improved, resistance to chemicals, the proportion of these units should be kept to a minimum.

Compounds with a higher proportion of hydrophilic units can be mixed with a suitable amount of commonly used glycidyl compounds and processed into stable aqueous dispersions. The compounds so admixed preferably have the same or a similar basis as the inventive compounds of the general formula (I), where a may also be 0.

The mixing ratio will depend on the structure of the particular polyglycidyl compound and can readily be determined.

The aqueous dispersions can be prepared by the procedures commonly employed in this field, optionally using customary aids and additives.

The analytical values given in the examples which follow were determined in conformity with the following standards:

| Hydroxyl (OH) value: | DIN 53240 |
|---|---|
| Isocyanate (NCO) value: | ASTM D 1638 |
| Epoxy value: | DIN 53188 |
| Amine value: | DIN 16945 |

PREPARATION OF INVENTIVE COMPOUNDS AND OF AQUEOUS DISPERSIONS

Example 1

In a 3-liter three-neck flask equipped with condenser, dropping funnel and stirrer, 1332 g (6 moles) of 3,3,5-trimethyl-1-isocyanato-5-isocyanato methylcyclohexane (isophorone diisocyanate) and 0.4 g of dibutyltin dilaurate are heated to 60° C. Over a period of 30 minutes, a solution of 120 g (1 mole) of diethylene glycol monomethyl ether and 80 g of xylene is added. After a total reaction period of 90 minutes at 60° C., the solvent and excess isophorone diisocyanate are removed by distillation.

344.6 g of reaction product with an isocyanate value of 4.5 and a residual isophorone diisocyanate content of 0.7% is obtained.

Example 2

In the apparatus from Example 1, 666 g (3 moles) of isophorone diisocyanate and 0.2 g of dibutyltin laurate are heated to 60° C. Over a period of 15 minutes, a solution of 1002 g of polyethylene glycol monomethyl ether (average molecular weight, 2004 g) and 668 g of xylene is added. The alcohol/xylene solution is first heated to 60° C. and then added at that temperature. After a total reaction period of 90 minutes at 60° C., the solvent and excess isophorone diisocyanate are removed by distillation.

1116.1 g of reaction product with an isocyanate value of 25.8 and a residual isophorone diisocyanate content of 0.28% is obtained.

Example 3

In a 1-liter three-neck flask equipped with condenser, dropping funnel and stirrer, a solution of 331.5 g of an epoxy resin based on bisphenol A with an epoxy value of 2.1 moles/kg and 83 g of xylene is heated to 60° C.

Over a period of 30 minutes, a solution of 2.21 g of the reaction product from Example 1, 43.3 g of the reaction product from Example 2, and 95.5 g of xylene is added at 60° C. After a total reaction period of 90 minutes at 60° C., the solvent is removed by distillation.

377 g of a reaction product with an epoxy value of 1.84 moles/kg is obtained.

Example 4

200 g of the reaction product from Example 3 is heated with 40 g of methoxy propanol to 70° C. and mixed over a period of 4 minutes at 18 rpm with 160 g of fully deionized water.

A stable dispersion with a viscosity of 1.1 Pa.s at 25° C. (as determined with a Haake rotational viscometer, MVI rotor, 64 rpm) is obtained.

Example 5

In the apparatus from Example 3, 250 g of an epoxy resin based on bisphenol A with an epoxy value of 2.1 moles/kg and 83 g of xylene are heated to 60° C., and over a period of 40 minutes 192 g of the reaction product from Example 1 is added. After a total reaction period of 90 minutes, the solvent is removed by distillation.

442 g of reaction product with an epoxy value of 1.18 moles/kg is obtained.

Example 6

In the apparatus from Example 1, 250 g of an epoxy resin based on bisphenol A with an epoxy value of 2.1 moles/kg and 83 g of xylene are heated to 60° C.

Over a period of 20 minutes, a solution with a temperature of 60° C. of 1228 g of the reaction product from Example 2 and 819 g of xylene is added.

After a total reaction period of 90 minutes, the solvent is removed by distillation.

1478 g of reaction product with an epoxy value of 0.35 mole/kg is obtained.

Example 7

In the apparatus from Example 3, 220 g of an epoxy resin based on bisphenol A with an epoxy value of 2.1 moles/kg, 30 g of the reaction product from Example 6, 20 g of the reaction product from Example 5 and 54 g of methoxy propanol are homogenized at 70° C. Over a period of 6 minutes, the mixture is mixed with 216 g of fully deionized water at 18 rps.

A stable dispersion with a viscosity of 1.4 Pa.s at 25° C. (determined as in Example 4) is obtained.

Example 8

In a 4-liter three-neck flask equipped with reflux condenser and stirrer, 1850 g of isophorone diisocyanate and 3.7 g of dibutyltin dilaurate are homogenized at 60° C. and over a period of 1 hour 1000 g of an anhydrous polyethylene glycol monomethyl ether (OH value: 467) is added.

Upon cooling, a reaction product with an NCO value of 156 is obtained.

Example 9

In the apparatus from Example 8, 500 g of isophorone diisocyanate and 1 g of diazabicyclo[2,2,2]octane are homogenized at 65° C. Over a period of 90 minutes, a mixture (2500 g) of anhydrous polyethylene glycol monomethyl ether (OH value: 75) and anhydrous xylene (32.6%) is added at 60° C. After a reaction period of 60 minutes, the solvent is removed. The reaction product is characterized by an NCO value of 54.

Example 10

In the apparatus from Example 8, 250 g of isophorone diisocyanate, 0.4 g of diazabicyclo[2,2,2]octane and 0.3 g dibutyltin dilaurate are homogenized at 55° C. Over a period of 60 minutes, 3700 g of a mixture of anhydrous polyethylene glycol monomethyl ether (OH value: 28) and xylene (39%) is added. After a reaction period of 40 minutes, the solvent is removed. The reaction product is characterized by an NCO value of 23.

Example 11

In the apparatus from Example 8, 2016 g of hexamethylene diisocyanate, 3 g of dibutyltin dilaurate and 1.5 g of diazabicyclo[2,2,2]octane are homogenized at 60° C. Over a period of 30 minutes, 1400 g of a mixture of anhydrous polyethylene glycol monomethyl ether (OH value: 75) and anhydrous xylene (35.9%) is added. After a reaction period of 70 minutes, the volatile components are removed by distillation. The reaction product has an NCO value of 58.

Example 12

In the apparatus from Example 8, 1914 g of diisocyanatotoluene, 2.5 g of dibutyltin dilaurate and 2 g of diazabicyclo[2,2,2]octane are homogenized at 63° C. Over a period of 35 minutes, 1400 g of a mixture of anhydrous polyethylene glycol monomethyl ether (OH value: 76) and anhydrous xylene (41.2%) is added. After a reaction period of 45 minutes, the volatile components are removed by distillation. The NCO value of the reaction product is 59.

Example 13

In the apparatus from Example 8, 2250 g of a novolac epoxy resin (epoxy value: 5.6 mol.kg$^{-1}$) is homogenized with 750 g of bisphenol A and 5.3 g of tetraethylammonium chloride at 100° C. The conversion of the reactants to a solid resin with an epoxy value of 2.00 mol.kg$^{-1}$ and an OH value of 123 occurs at 140°–150° C.

Example 14

In the apparatus from Example 8, 2184 g of a bisphenol A resin (epoxy value: 5.4 mol.kg$^{-1}$), 616 g of bisphenol F and 5.1 g of tetraethylammonium chloride are homogenized at 110° C. The conversion of the reactants to a solid resin with an epoxy value of 2.01 mol.kg$^{-1}$ and an OH value of 125 occurs at 140°–155° C.

Example 15

In the apparatus from Example 8, 2295 g of a bisphenol A resin (epoxy value: 5.45 mol.kg$^{-1}$), 705 g of bisphenol A and 5.1 g of tetraethylammonium chloride are homogenized at 100° C. The conversion to a solid resin with an epoxy value of 2.11 mole.kg$^{-1}$ and an OH value of 115 occurs at 145°–155° C.

Example 16

In the apparatus from Example 8, 2220 g of a bisphenol F resin (epoxy value: 5.9 mol.kg$^{-1}$), 780 g of bisphenol A and 5.5 g of tetraethylammonium chloride are homogenized at 100° C. The conversion of the reactants to a solid resin with an epoxy value of 2.09 mole.kg$^{-1}$ and an OH value of 128 occurs at 140°–150° C.

Example 17

In the apparatus from Example 8, 2232 g of a bisphenol A resin (epoxy value: 5.45 mol.kg$^{-1}$), 768 g of bisphenol C and 5.5 g of tetraethylammonium chloride are homogenized at 100° C. The reactants are converted at 140°–150° C. to a solid resin with an epoxy value of 2.06 mole.kg$^{-1}$ and on OH value of 114.

Example 18

In the apparatus from Example 8, 1800 g of the epoxy resin from Example 13 and 600 g of anhydrous xylene are homogenized at 65° C. Over a period of 30 minutes, a mixture of 27.3 g of the isocyanate from Example 8, 46.5 g of the isocyanate from Example 9 and 106.4 g of the isocyanate from Example 10, dissolved in 100 g of anhydrous xylene, is added.

After a reaction period of 40 minutes, the solvent is removed by distillation. A resin with 1.81 moles of epoxy groups per kg is obtained.

Example 19

In the apparatus from Example 8, 1800 g of the resin from Example 14 is homogenized with 700 g of anhydrous xylene at 60° C. Over a period of 45 minutes, a mixture of 22.5 g of the isocyanate from Example 8, 32 g of the isocyanate from Example 9 and 73 g of the isocyanate from Example 10, dissolved in 90 g of anhydrous xylene, are added. After a reaction period of 30 minutes, the solvent is removed. A resin with an epoxy value of 1.88 mole.kg$^{-1}$ is obtained.

Example 20

In the apparatus from Example 8, 1700 g of the resin from Example 15 is homogenized with 700 g of anhydrous xylene at 60° C. Over a period of 40 minutes, a mixture of 21 g of the isocyanate from Example 8, 28.4 g of the isocyanate from Example 11 and 69 g of the isocyanate from Example 10, dissolved in 95 g of anhydrous xylene, is added. After a reaction period of 30 minutes, the solvent is removed. A resin with an epoxy value of 1.86 mol.kg$^{-1}$ is obtained.

Example 21

In the apparatus from Example 8, 1900 g of the resin from Example 16 and 600 g of anhydrous xylene are homogenized at 60° C. Over a period of 40 minutes, a mixture of 14.9 g of the isocyanate from Example 8, 40.2 g of the isocyanate from Example 12 and 96.8 g of the isocyanate from Example 10, dissolved in 120 g of anhydrous xylene, is added. After a reaction period of 30 minutes, the solvent is removed. A resin with an epoxy value of 1.91 mol.kg$^{-1}$ is obtained.

Example 22

In the apparatus from Example 8, 1900 g of the resin from Example 17 is homogenized with 700 g of anhydrous xylene at 65° C. Over a period of 30 minutes, a mixture of 26 g of the isocyanate from Example 8, 70 g of the isocyanate from Example 12 and 118 g of the isocyanate from Example 10, dissolved in 130 g of anhydrous xylene, is added. After a reaction period of 40 minutes, the solvent is removed. A resin with an epoxy value of 1.85 mol.kg$^{-1}$ is obtained.

Example 23

In the apparatus from Example 8, 1800 g of the resin from Example 15 is homogenized with 600 g of anhydrous xylene at 65° C. Over a period of 35 minutes, a mixture of 48.4 g of the isocyanate from Example 8, 68.8 g of the isocyanate from Example 9 and 157 g of the isocyanate from Example 10 is added. The temperature of the mixture is adjusted to 65° C. After a reaction period of 35 minutes, the solvent is removed. An epoxy resin with an epoxy value of 1.83 mol.kg$^{-1}$ is obtained.

Example 24

In a 65-liter high-grade steel reactor equipped with a commercial ribbon (double-helical) agitator, a vapor pipe, a condenser, a double distillate collector, a vacuum pump and a jacket heater, a mixture of 20 kg of the resin from Example 15 is homogenized with 7 kg of anhydrous xylene at 65° C. at a rate of agitation of 80 rpm. Over a period of 60 minutes, a mixture having a temperature of 65° C. of 666 g of the isocyanate from Example 8, 946 g of the isocyanate from Example 9 and 2163 g of the isocyanate from Example 10 is added. After a reaction period of 45 minutes, the solvent is removed. A resin with an epoxy value of 1.76 mol.kg$^{-1}$ is obtained.

Example 25

In the apparatus from Example 3, 250 g of the resin from Example 20 is homogenized with 20 g of isopropanol and 30 g of methoxy propanol at 75° C. and over a period of 5 minutes mixed with 200 g of fully deionized water with a temperature of 70° C. A stable dispersion with a viscosity of 520 mPa.s at 25° C. (as determined with a Haake rotational viscometer, MVI rotor, 128 rpm) is obtained.

Example 26

In the apparatus from Example 24 with an associated disperser (Supraton S200, made by Krupp in Essen), 20 kg of the resin from Example 24 is homogenized with 1600 g of benzyl alcohol and 2400 g of methoxy propanol at 80° C. over a period of 10 minutes, 12000 g of fully deionized water, heated to 80° C., is added while the disperser is running, and dispersing is continued for another 10 minutes at 5400 rpm.

A stable aqueous dispersion with a viscosity of 160 mPa.s at 25° C. and 256 rpm with the MVI rotor is obtained.

Example 27

180 parts by weight of the dispersion from Example 24 are mixed with 68.5 parts by weight of an aqueous polyamine adduct solution (adduct based on bisphenol A diglycidyl ether [epoxy value: 0.54] with an aliphatic diamine [amine value of adduct: 110]). The viscosity is adjusted to 1 Pa.s with 64 parts by weight of water. The viscosity of the mixture remains constant for 90 minutes. After 120 minutes, the viscosity increases by 50%, and after 150 minutes by another 50%, based on the initial value.

Example 28

100 g of the dispersion from Example 24 is mixed with 16.5 g of a polyamine adduct curing agent (Euredur ® 36, trademark of Schering AG, an adduct based on bisphenol A diglycidyl ether [epoxy value: 0.54] and an alicyclic amine [amine value of adduct: 220]) and 13.5 g of water. The viscosity of the mixture is 1 Pa.s. The viscosity of the mixture remains constant for 3 hours and then increases by 30–50%.

Example 29

100 g of the mixture from Example 28 is pigmented with 35 g of BaSO$_4$ and 35 g of TiO$_2$. The viscosity of the mixture remains constant at 1.5 Pa.s for 3 hours.

Example 30

The mixture from Example 28 is applied with a 40 μ wire-wound metering rod coater as a film. After 4.5 minutes, the film is so dry that no dust will adhere to it. (DIN 53150.) The film thickness is 12 μ.

Example 31

The mixture from Example 29 is applied with a 40 μ wire-wound metering rod coater as a film. After 4 minutes, the film is so dry that no dust will adhere to it. The film thickness is 12 μ.

Example 32

The mixture from Example 28 is applied with a 60 μ wire-wound metering rod coater. The mechanical strength (DIN 53153) of the film, cured at room temperature, is 43 after 24 hours, 50 after 48 hours, 54 after 72 hours, and 58 after 168 hours.

When curing is carried out at 5° C., the value of 37 after 24 hours increases to 41 after 168 hours. Curing at 100° C. yields a value of 39 after 24 hours and a value of 44 after 168 hours.

Example 33

The mixture from Example 28 is applied with a 60 μ wire-wound metering rod coater. After a seven-day cure at room temperature, the depth of the impression in the Erichsen cupping test (DIN 53156) is 9.1 mm.

Example 34

In the apparatus from Example 8, 1,200 g of a bisphenol A resin (epoxy value, 2.1 mols/kg) and 400 g of anhydrous xylene are homogenized at 70° C. Over a period of 30 minutes, a mixture of 40 g of the isocyanate from Example 8, 56.8 g of the isocyanate from Example 9 and 129.8 g of the isocyanate from Example 10, dissolved in 120 g of anhydrous xylene, is added. After a 30-minute reaction period, the solvent is removed by distillation. A resin with 1.8 mols epoxy groups per kg is obtained.

Example 35

600 g of the resin from Example 34 is homogenized at 85° C. with 36 g of benzyl alcohol. At 85° C., 440 g of demineralized water is added over a period of 7 minutes at 66 rps.

A stable dispersion with a viscosity of 630 mPa's at 25° C. is obtained.

Example 36

600 g of the resin from Example 34 is dispersed at 90° C. with 480 g of demineralized water over a period of 5 minutes at 85 rps.

The viscosity of the stable dispersion is 610 mPa's at 25° C.

We claim:

1. A water-dispersible mixture comprising at least one compound of the general formula

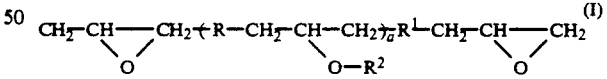

where R and R$^1$ are, independently of one another,

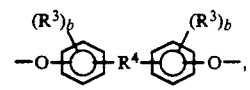

or

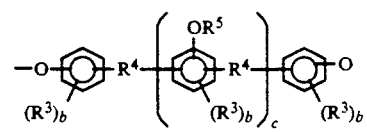

wherein $R^3$ is a $C_{1-3}$ alkyl group,
$R^4$ is a $C_{1-4}$ alkylene moiety,
$R^5$ is

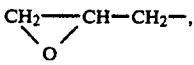

each b is, independently of one another, an integer of from 0 to 4;
c is 1 to 10;
a is 1 to 20, and
$R_2$ is H and at least once the group

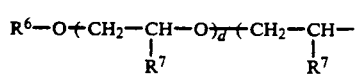

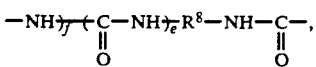

$R^6$ is a $C_{1-5}$ alkyl group,
$R^7$ is H or $CH_3$,
d is 1 to 100,
e is 0 or 1,
f is 0 or 1, and
$R^8$ is an aliphatic, cyclic, alicyclic, aromatic or araliphatic hydrocarbon group, optionally at least one polyglycidyl ether based on a bisphenol and/or novolac, and optionally solvents.

2. An aqueous dispersion comprising at least one compound of the general formula

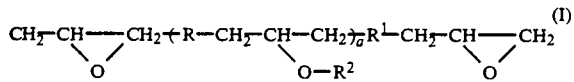

where R and $R^1$ are, independently of one another,

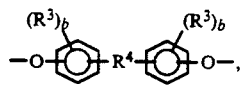

or

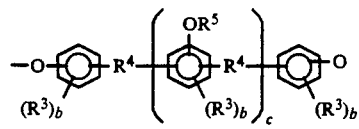

wherein
$R^3$ is a $C_{1-3}$ alkyl group,
$R^4$ is a $C_{1-4}$ alkylene moiety,
$R^5$ is

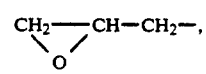

each b is, independently of one another, an integer of from 0 to 4;
c is 1 to 10;
a is 1 to 20, and
$R_2$ is H and at least once the group

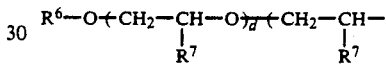

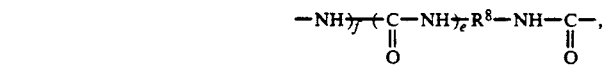

$R^6$ is a $C_{1-5}$ alkyl group,
$R^7$ is H or $CH_3$,
d is 1 to 100,
e is 0 or 1,
f is 0 or 1, and
$R^8$ is an aliphatic, cyclic, alicyclic, aromatic or araliphatic hydrocarbon group, optionally at least one polyglycidyl ether based on a bisphenol and/or novolac, and optionally at least one adjuvant selected from the group consisting of solvents, flow-control agents, defoamers, pigments, and dyes.

* * * * *